US012717669B2

(12) United States Patent
Wang et al.

(10) Patent No.: US 12,717,669 B2
(45) Date of Patent: Aug. 25, 2026

(54) METHOD AND DEVICE FOR EXECUTING A TIME-CRITICAL PROCESS IN NON-REAL-TIME OPERATING SYSTEM

(71) Applicant: Schneider Electric Industries SAS, Rueil-Malmaison (FR)

(72) Inventors: Yizhou Wang, Shanghai (CN); Jing Zhou, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 1141 days.

(21) Appl. No.: 17/715,176

(22) Filed: Apr. 7, 2022

(65) Prior Publication Data

US 2022/0327015 A1 Oct. 13, 2022

(30) Foreign Application Priority Data

Apr. 9, 2021 (CN) ......................... 202110381445.9

(51) Int. Cl.
*G06F 11/07* (2006.01)
*G06F 9/54* (2006.01)

(52) U.S. Cl.
CPC .......... *G06F 11/0772* (2013.01); *G06F 9/544* (2013.01); *G06F 11/0757* (2013.01); *G06F 11/076* (2013.01)

(58) Field of Classification Search
CPC .. G06F 11/0772; G06F 9/544; G06F 11/0757; G06F 11/076; G06F 2209/542; G06F 11/362
See application file for complete search history.

(56) References Cited

U.S. PATENT DOCUMENTS

2014/0173630 A1* 6/2014 Whitfield ................ G06F 9/546 719/314
2020/0106671 A1* 4/2020 Goel ..................... H04L 41/142

FOREIGN PATENT DOCUMENTS

CN 106961396 A 7/2017

OTHER PUBLICATIONS

Diallo, Ousmane, Joel JPC Rodrigues, and Mbaye Sene. "Real-time data management on wireless sensor networks: A survey." Journal of Network and Computer Applications 35.3 (2012): 1013-1021. (Year: 2012).*

(Continued)

*Primary Examiner* — Saif A Alhija
(74) *Attorney, Agent, or Firm* — Patterson + Sheridan, LLP

(57) ABSTRACT

Method and device for executing time critical processing in a non-real-time operating system. The method includes capturing a message by a packet capturing tool; analyzing whether the message is a sample value message associated with the time critical processing, and when the message is a sample value message associated with the time critical processing, writing a data unit included in the sample value message into a first buffer; preprocessing the data unit, the preprocessing includes arranging and combining bytes of the data unit so that the bytes indicate sample value is located at specific position; writing the preprocessed data unit from the first buffer into a second buffer and triggering a real-time dedicated thread at the same time, in response to the preprocessed data unit in the first buffer reaching the predetermined number; and executing the time critical processing by reading the preprocessed data unit from the second buffer.

10 Claims, 9 Drawing Sheets

(56) References Cited

OTHER PUBLICATIONS

Prisching, Dietmar, Bernhard Rinner, and Graz Aaustria. "Thread-based analysis of embedded applications with real-time and non real-time processing on a single-processor platform." Embedded World (2003). (Year: 2003).*

Extended European Search Report and Search Opinion dated Aug. 30, 2022 for corresponding European Patent Application No. 22305497.4, 11 pages.

https://www.codeproject.com/Articles/43510/Lock-Free-Single-Producer-Single-Consumer-Circular, "Lock-free producer-consumer circular queue", Dec. 31, 2014, 26 pages.

Chinese Office Action dated Jun. 14, 2025 for corresponding Chinese Patent Application No. 202110381445.9, 22 pages.

* cited by examiner

METHOD AND DEVICE FOR EXECUTING A TIME-CRITICAL PROCESS IN NON-REAL-TIME OPERATING SYSTEM

TECHNICAL FIELD

The present disclosure relates to a method and device for executing time critical processing in non-real-time operating system and more particularly, to a method for executing time critical processing associated with a sample value message in non-real-time operating system of computing device (such as personal computer), and a device for executing the method.

BACKGROUND

In a power system such as smart substations, for some emergencies or specific tasks, it is hoped that the power system being capable of handling these events or tasks in real-time to minimize losses. For example, for relay protection in the power system, it is hoped that a fault circuit will be break at the first time to reduce the possibility of occurrence of major accidents when a circuit failure is detected in the fault circuit. At present, it depends on the Real-time Operating System (RTOS) of the power system to processes the sample value message of the power system in real-time to enable responses to emergencies or specific tasks. Software development and debugging of the RTOS are usually carried out after the development and debugging of hardware including Printed circuit board (PCB). However, in some special cases, for example, the software development or debugging of the RTOS cannot be carried out due to the obstruction of hardware development and debugging (for example, the components needed for hardware development cannot be obtained on schedule due to the COVID-19 pandemic) or due to no test conditions on site, it is expected that the non-real-time operating system can be utilized to simulate the RTOS for software development and debugging.

SUMMARY OF THE INVENTION

In view of this, the embodiments of the present disclosure are directed to provide a method and a device capable of executing time critical processing in non-real-time operating system, which can better meet the real-time requirements of time critical processing in non-real-time operating system.

An aspect of the present disclosure provides a method for executing time critical processing in non-real-time operating system. The method comprises capturing a message from an external device by a packet capturing tool; analyzing whether the message is a sample value message associated with the time critical processing, and when the message is a sample value message associated with the time critical processing, writing a data unit included in the sample value message into a first buffer, preprocessing the data unit(s) written into the first buffer, the preprocessing includes arranging and combining bytes of the data unit(s) so that the bytes indicate the sample value(s) is located at specific position(s); writing a predetermined number of preprocessed data unit(s) from the first buffer into a second buffer that is dedicated to a real-time dedicated thread and triggering the real-time dedicated thread at the same time in response to the preprocessed data unit(s) in the first buffer reaching the predetermined number, and executing the time critical processing by reading the preprocessed data unit(s) from the second buffer by the real-time dedicated thread.

Optionally, the writing a predetermined number of preprocessed data unit(s) from the first buffer into the second buffer comprises writing the preprocessed data unit(s) into the second buffer based on a write pointer of the second buffer, and for each writing, the offset of the write pointer of the second buffer is determined as the number of the written data unit(s), and the reading the preprocessed data unit(s) from the second buffer by the real-time dedicated thread comprises reading the data unit(s) from the second buffer based on a read pointer of the second buffer, and for each reading, the offset of the read pointer is determined as the offset at which the read pointer after reading aligns with the current write pointer if a processing capability of the non-real-time operating system allows.

Optionally, triggering an error information when the determined offset of the read pointer exceeds a predetermined offset threshold.

Optionally, the time critical processing includes sample value acquisition, sample value processing and protection decision making, and the sample value acquisition is triggered in response to the real-time dedicated thread being triggered, which is used for acquiring the sample value(s) in the data unit(s) from the second buffer; the sample value processing is triggered in response to the completion of the execution of the sample value acquisition, which is used for processing the sample value(s) to form a data for making a protection decision, and the protection decision making is triggered in response to the sample value processing having been executed for a predetermined number of times, which is used for making the protection decision according to the data for executing the protection decision.

Optionally, the method further comprises writing, by the real-time dedicated thread, a result data generated by executing the time critical processing into a local database.

Another aspect of the present disclosure provides a device for executing time critical processing in a non-real-time operating system. The device comprise a message capturing module, for capturing a message from an external device by a packet capture tool; a message analyzing module, for analyzing whether the message is a sample value message associated with the time critical processing, and when the message is a sample value message associated with the time critical processing, writing a data unit included in the sample value message into a first buffer; a message preprocessing module, for preprocessing the data unit(s) written into the first buffer, the preprocessing includes arranging and combining bytes of the data unit(s) so that the bytes indicate the sample value(s) is located at specific position(s), a real-time dedicated thread triggering module, writing a predetermined number of preprocessed data unit(s) from the first buffer into a second buffer that is dedicated to a real-time dedicated thread and triggering the real-time dedicated thread at the same time in response to the preprocessed data unit(s) in the first buffer reaching a predetermined number, and a real-time dedicated thread execution module, executing the time critical processing by reading the preprocessed data unit(s) from the second buffer by the real-time dedicated thread.

Optionally, the real-time dedicated thread triggering module writes the preprocessed data unit(s) into the second buffer based on a write pointer of the second buffer, and for each writing, the offset of the write pointer of the second buffer is determined as the number of written data unit(s); and the real-time dedicated thread triggering module reads the preprocessed data unit(s) from the second buffer includes reading the data unit(s) from the second buffer based on a read pointer of the second buffer, and for each reading, the offset of the read pointer is determined as the offset at which the read pointer after reading aligns with the current write pointer if a processing capacity of the non-real-time operating system allows.

Optionally, the device further comprises an error reporting module, for triggering an error information when the determined offset of the read pointer exceeds a predetermined offset threshold.

Yet another aspect of the present disclosure provides a device for executing time critical processing in a non-real-time operating system, the device comprises a processor and a memory, the memory has a computer executable program stored therein, which when executed by the processor, causes the device to execute the above method of executing time critical processing in non-real-time operating system.

Yet another aspect of the present disclosure provides a computer readable storage medium, which has a computer instruction stored thereon, the computer instruction when executed by a processor, implements the method of executing time critical processing in non-real-time operating system.

Therefore, the method and the device according to the embodiments of the present disclosure can execute time critical processing in non-real-time operating system, and can better meet the real-time requirement of time critical processing. Moreover, in a case that the network transmission rate and compute capability of the computing device of the current non-real-time operating system are strong, an effect comparable to that of executing time critical processing in real-time operating system can be achieved.

BRIEF DESCRIPTION OF THE DRAWINGS

To more clearly illustrate the technical solution of the embodiments of the present disclosure, the drawings used in the description of the embodiments will be briefly introduced below. Apparently, the drawings in the following description are merely some exemplary embodiments of the present disclosure, and for those of ordinary skill in the art, other drawings can also be obtained according to these drawings without creative efforts.

DESCRIPTION OF THE EMBODIMENTS

The present disclosure will be described in detail below with reference to exemplary embodiments thereof. However, the present disclosure is not limited to the embodiments described herein, which can be implemented in many different forms. The described embodiments are merely used to make the present disclosure thorough and complete, and to fully convey the concept of the present disclosure to those skilled in the art. The features of the various embodiments described can be combined or substituted with each other, unless explicitly excluded or should be excluded according to the context.

Unless otherwise specified, the technical terms or scientific terms used in the disclosure should have the ordinary meaning understood by people with ordinary skills in the art to which this disclosure belongs. The “first,” “second” and similar words used in the disclosure do not indicate any order, quantity, or importance, but are merely used to distinguish different elements.

In a system under test involving sampling, sample values obtained by sampling is transferred to an apparatus or device that can execute processing on the sample values. It is expected that the apparatus or device that executes processing on the sample values in real-time if the sample value is an important data for judging the current state of the system under test, making respective protection decisions, or even issuing control commands. The processing associated to the sample values that needs to be executed in real-time is hereinafter called time critical processing. Time critical processing represents a processing that the processing of the last batch of input data needs to be executed before the next batch of input data arrives in the real-time operating system.

Take a power system (such as a smart substation) as an example, which uses transformer to collect voltage and/or current sample values in the system, and such sample values can characterize the power protection status of the power system, and accordingly, it is hoped that the time critical processing associated with the sample values can be executed as quickly as possible. As an example, time critical processing can include, for example, sample value acquisition, sample value processing (e.g., including resampling and/or filtering), protection decision making, RMS calculation, measurement, and/or I/O mapping, etc.

Figure 1:
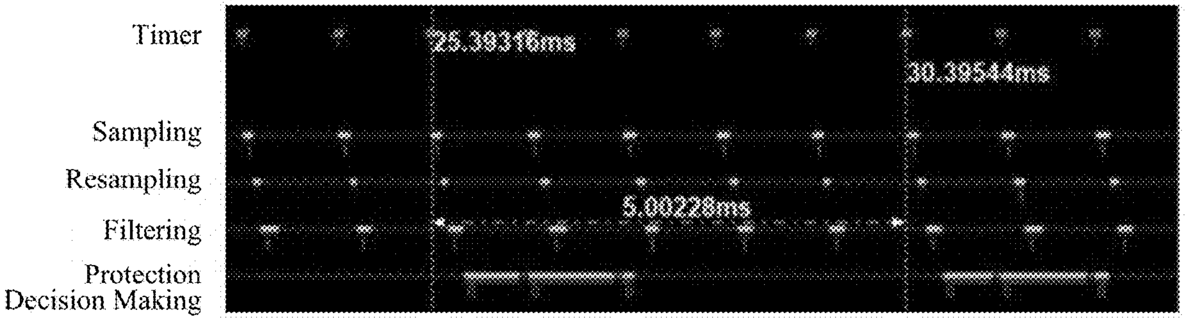
FIG. 1 is a schematic diagram of executing time critical processing in real-time operating system.

FIG. 1 is a schematic diagram of executing time critical processing in the real-time operating system.

Real-time operating system is a preemptive operating system, which is characterized in that as long as a high-priority task is ready, no matter whether a low-priority task is being executed or in the sleep state, the low-priority task will be immediately interrupted and switched to the execution of the high-priority task. Commonly used real-time operating systems include embedded Linux, embedded Windows, VxWorks, RT-Thread, uCOS, QNX, WinCE, etc.

Still taking the power system as an example, referring to FIG. 1, it shows a timing diagram of executing time critical processing for sample values of the power system in the real-time operating system VxWorks, and the time critical processing includes sampling, resampling, filtering, and protection decision making. As shown in an example of FIG. 1, the real-time operating system triggers sampling once every 1 ms through a timer, and the completion of sampling triggers resampling, and the completion of resampling triggers filtering, and the protection decision making is triggered when sampling, resampling, and filtering are executed five times in total. During the period in which the timer runs from 25.39316 ms to 30.39544 ms, sampling, resampling, and filtering were executed 5 times in total and protection decision making was executed once. In other words, the time critical processing for the sample values executed by the real-time operating system depends on the timer triggering sampling every lms to ensure the sampling interval of 1 ms and the guard interval of 5 ms.

As mentioned above, in some special cases, it is expected that the non-real-time operating system can be utilized to simulate the real-time operating system, and it is expected that the time critical processing on the sample values can also be executed as real-time as possible in the non-real-time operating system.

Figure 2:
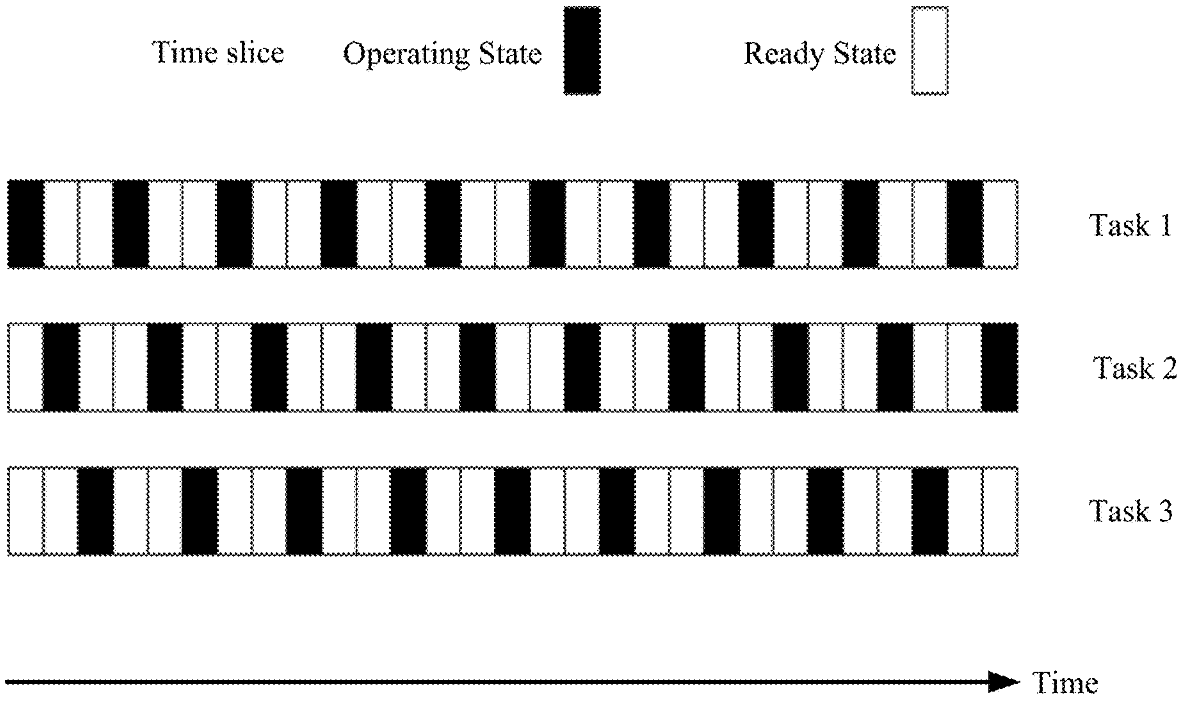
FIG. 2 is a schematic diagram of a task scheduling mechanism of non-real-time operating system.

FIG. 2 is a schematic diagram of the task scheduling mechanism of the non-real-time operating system.

The non-real-time operating system can be a general-purpose operating system (such as Windows, Linux, etc.) operating on a computing device such as personal computer, workstations, servers, etc. Unlike real-time operating systems, non-real-time operating systems are not preemptive operating systems. It is characterized in that even if the high-priority tasks need to be executed, the low-priority tasks will not be interrupted immediately and switched to execute the high-priority tasks, but wait for the low-priority tasks to be executed within the current time slice or the end of the current time slice.

Referring to FIG. 2, the task scheduling mechanism of the non-real-time operating system is based on time slice rotation, in which each of Task 1, Task 2 and Task 3 is forcibly suspended after being executed for a short period of time, and then the next task starts to be executed, so that each task is executed in turn and the short period of time is called a time slice. The state when a task is being executed is called operating state, and the suspended task is in ready state to wait for the arrival of the next time slice belonging to it. The advantage of the time slice rotation is that each task can be executed, and because the short period of time represented by the time slice is very short, the fast switching between tasks brings the user experience as if multiple tasks are "operating at the same time".

It can be seen that there is a difference in sampling synchronization between real-time operating system and non-real-time operating system for time critical processing of sample values. However, the processing capability of the computing devices of current non-real-time operating system is very strong, and the processing frequency is much higher than the expected processing frequency of the task to be processed, thus the small-time deviation can not affect the real-time execution of the task to be processed. For example, the processing frequency of one core of the processor of the existing conventional personal computer up to several GHz, and one processor usually has several cores. In this case, the present disclosure contemplates a technical solution for executing time critical processing in the non-real-time operating system, which can enable the non-real-time operating system to better implement the real-time requirement of time critical processing.

Figure 3:
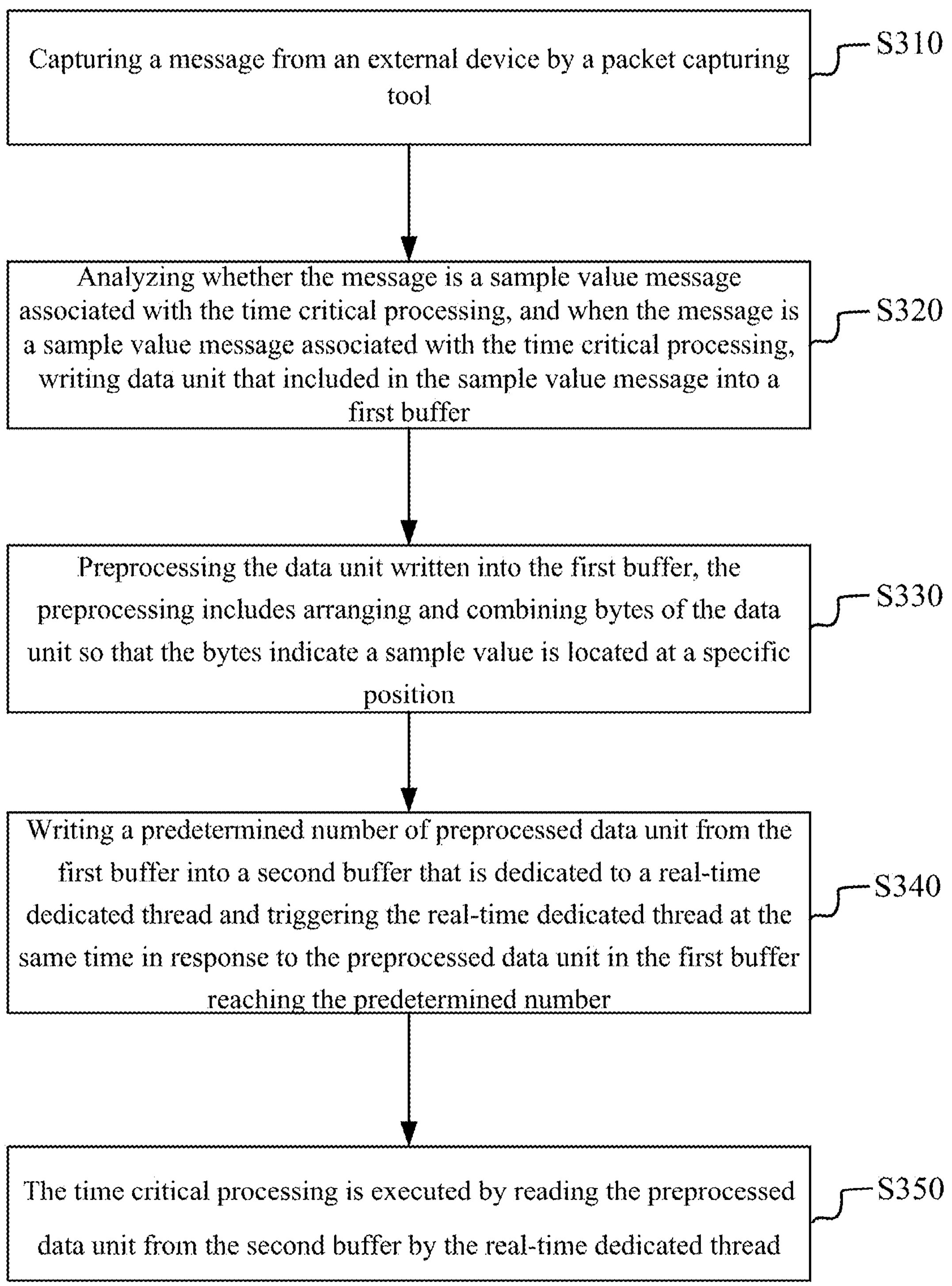
FIG. 3 is a schematic flowchart of the method for executing time critical processing in non-real-time operating system according to an embodiment of the present disclosure.

FIG. 3 is a schematic flowchart of the method for executing time critical processing in the non-real-time operating system according to an embodiment of the present disclosure.

As shown in FIG. 3, the method 300 for executing time critical processing in the non-real-time operating system according to an embodiment of the present disclosure includes steps S310-S350.

In step S310, capturing a message from an external device by a packet capturing tool.

The external device may be a device that is located outside the computing device of the non-real-time operating system and communicatively connected with the computing device via a communication method such as Ethernet card. The messages can be various messages from communication pathways such as Ethernet. In the present disclosure, the sample values of the system under test are carried in messages to be sent to the computing device having the non-real-time operating system therein.

The package capturing tool can be, for example, WinPcap of Window operating system or emcek/packet of Linux operating system. They can bypass the protocol stack of the non-real-time operating system to "sniff" the messages transmitted on the network. For example, based on the call back function, WinPcap is called to "sniff" the message every time the external device transmits a frame of the message.

In step S320, analyzing whether the captured message is a sample value message associated with the time critical processing, and when the message is a sample value message associated with the time critical processing, writing the data unit(s) included in the sample value message into the first buffer.

Still taking the power system as an example of the system under test, for example, the power system is operated and maintained according to the communication protocol IEC 61850-9-2, then the sample value message is the message that conforms to the frame format specified by the communication protocol IEC 61850-9-2. The sample value message is formed after combining, synchronizing, and packaging the synchronized sample data of the voltage and/or current sample values in the power system by the merging unit or other apparatus with equivalent functions to the merging unit, and the voltages and/or currents sample values are included therein. In this step, whether the message is a sample value message associated with time critical processing can be determined according to, for example, the frame format specified by the communication protocol IEC 61850-9-2. If so, the data unit(s) included in the sample value message is written into the first buffer.

Specifically, as an example, the frame format of the sample value message conforming to the communication protocol IEC 61850-9-2 comprises Preamble, start-of-frame delimiter (SFD), MAC header (including destination address and source address), priority indicia (TPID, TCI), Ethernet type, Ethernet type PCU, application protocol data unit(s) (APDU(s)), optional padding bytes, frame check sequence, etc. APDU can be linked by one or more application service data unit, ASDU, as shown in the following table.

| Tag | Length | The number of ASDU: n | ASDU1 | ASDU2 | . . . ASDUn |
|---|---|---|---|---|---|

In other words, after that the captured message is determined as a sample value message associated with time critical processing, the n ASDUs included therein are written into the first buffer. For example, in a case that the sampling rate is 4000 Hz and the power frequency is 50 Hz, there are 80 sample points per cycle wave, and the voltage and/or current sample value related to one sample point is carried by one ASDU in the sample value message, and the number n of ASDUs included in each sample value message can be an appropriate value matching the sample rate, e.g. 1, 2, 4, etc., for example, the number n of ASDUs matching the sample rate of 4000 Hz/4800 Hz can be 4.

In step S330, preprocessing the data unit(s) written into the first buffer. The preprocessing of this step can include arranging and combining bytes of the data unit(s) so that the bytes indicate the sample value(s) is located at specific position(s). For example, for the said example of power system, the sample value message is formed by synchronizing and packaging the voltage/current sample values from each sample channel by the merging unit, and the mapping relationship between the data representing the voltage/current sample value in the data unit(s) in the sample value message and each sample channel needs to be parsed by preprocessing. In this case, the preprocessing may be an operation of matching the data indicating the voltage/current sample value in the data unit(s) (for example, bytes in the data unit) with each sample channel, thus the voltage/current sample value of each sample channel can be indicated.

In step S340, writing a predetermined number of preprocessed data unit(s) from the first buffer into a second buffer that is dedicated to a real-time dedicated thread and triggering the real-time dedicated thread at the same time in response to the preprocessed data unit(s) in the first buffer reaching the predetermined number.

The "predetermined number" in this step can be set according to the real-time requirement of time critical processing. For example, assuming that the number of ASDUs included in each sample value message is set to 4, the "predetermined number" can be set to 4 if the real-time requirement of time critical processing is very high, that is, time critical processing is executed on the 4 ASDUs in one sample value message every time the one sample value preprocessed. Alternatively, the "predetermined number" can also be set to 8 if the real-time requirement of time critical processing is medium, that is, time critical processing is executed on the 8 ASDUs in two sample value messages every time the two sample value messages are preprocessed.

Real-time dedicated thread is a thread dedicated to executing the time critical processing associated with the sample value message. There may be a real-time dedicated thread pool including one or more real-time dedicated threads. In this case, triggering the real-time dedicated thread refers to triggering one real-time dedicated thread in the real-time dedicated thread pool. Triggering real-time dedicated threads can be implemented by, for example, Semaphore, and the function of Semaphore is to limit the number of threads accessing specific resources at the same time. By using separate real-time dedicated thread to execute the time critical processing associated with the sample value message, the previous batch of input data can be executed as much as possible before the next batch of input data (for example, the next batch of sample value message) arrives, so as to better meet the real-time requirements of the time critical processing.

In step S350, the time critical processing is executed by reading the preprocessed data unit(s) from the second buffer by the real-time dedicated thread.

Therefore, the method 300 for executing time critical processing in non-real-time operating system according to the embodiment of the present disclosure can better meet the real-time execution of time critical processing in non-real-time operating system by receiving the sample value message carrying the sample values through the communication interface such as Ethernet, using the first buffer and the second buffer, and by the real-time dedicated thread to execute time critical processing as quickly as possible. In present general-purpose computing devices, the transmission rate of the communication interface is very high (for example, more than 100 Mbps), and the computing capability is very strong (for example, up to several GHz). The present disclosure can achieve a processing effect comparable to or even better than that of the real-time operating system in the non-implementation operating system.

For example, taking the power system as an example, when the sampling rate is 4000 Hz and the power frequency is 50 Hz, there are 80 sampling points for each cycle wave, and each sampling value message carries data for 4 sampling points (i.e., 4 ASDUs), then 20 sampling value messages are generated corresponding to each cycle wave (i.e., corresponding to 20 ms), and the length of each sampling value message is less than 600 bytes. Taking the transmission rate of Ethernet as 100 Mbps, that is, 12.5 MB/s as an example, the number of messages can be transmitted in 1 ms is up to 20, which is far higher than the requirement of transmitting 20 messages in 20 ms. Even if the messages transmitted by Ethernet contain other messages besides the sampled value messages, the interval between capturing two sampled value messages continuously will not exceed 1 ms, what's more, the transmission rate of Ethernet has reached the order of Gbps at present. The performance of an ordinary computing equipment can fully meet the requirement of processing 20 samples value messages in 20 ms. For example, when the inventor of the present disclosure uses the CPU Intel Xeon E3-1220 v6 with 4 cores and 4 threads with a processing frequency of 3.00 GHz and 16 GB RAM to execute the above method 300, the real-time processing of 96 sample value messages within 20 ms is realized under the condition that the sampling frequency is 4800 Hz and each sample value message carries one ASDU. Higher network transmission performance and higher CPU hardware performance can adapt to higher sampling rates.

Figure 4:
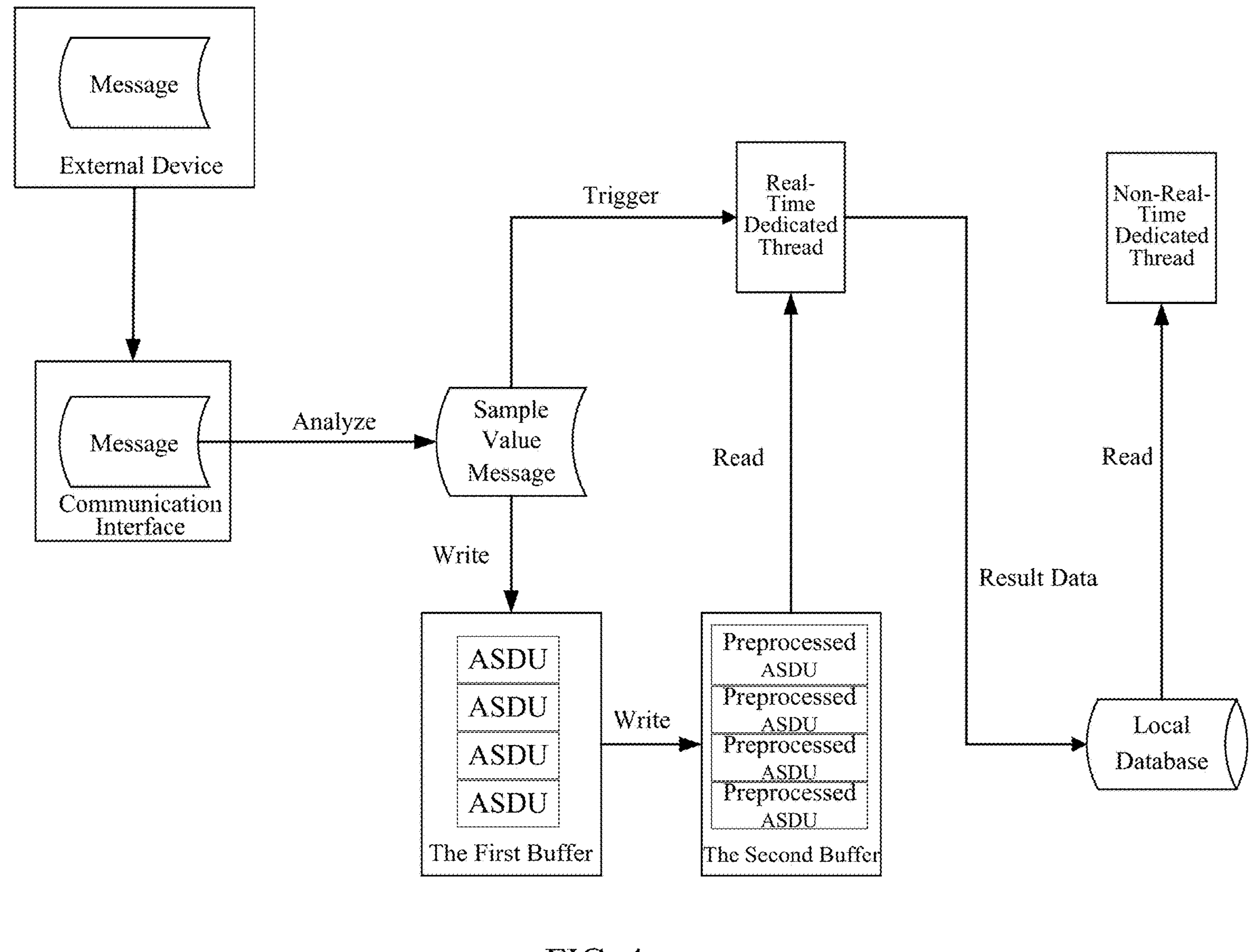
FIG. 4 is another schematic diagram of the method for executing time critical processing in non-real-time operating system according to an embodiment of the present disclosure.

To better illustrate the method 300 of FIG. 3, FIG. 4 is another schematic diagram of the method for executing time critical processing in the non-real-time operating system according to an embodiment of the present disclosure.

Referring to FIG. 4, the message from the external device is transmitted to the computing device of the non-real-time operating system via the communication interface. As a way to respond to the external device, the non-real-time operating system enables the "interrupt" mode to process the message, for example, capturing the message by utilizing the packet capture tool. Then, whether the captured message is the sample value message associated with time critical processing is determined according to a predefined rule (for example, for the example of the foregoing power system, the predefined rule can be the frame format of the sample value message specified in the communication protocol IEC 61850-9-2), and if so, the data unit(s) of the captured sample value message are written into the first buffer. Then, preprocessing is executed on the data unit(s) in the first buffer, the preprocessing may include the operation of arranging and combining the bytes in the data unit(s) so that the bytes indicate the sample value(s) is located at the specific position(s). When the number of preprocessed data unit(s) in the first buffer reaches the predetermined number, the predetermined number is written into the second buffer, and the real-time dedicated thread is triggered at the same time, for example, by Semaphore, to start executing time critical processing for the sample value message.

As shown in FIG. 4, the result data obtained by executing the time critical processing by the real-time dedicated thread can be written into the local database of the computing device for use by the non-real-time dedicated thread. Compared with real-time dedicated thread, non-real-time dedicated thread is used to execute non-time critical processing with lower real-time requirements than the time critical processing in real-time dedicated thread. For example, for the example of the foregoing power system, non-time critical processing includes but is not limited to Human Machine Interface (HMI) updating, other processing to be executed according to the provisions of the communication protocol IEC 61850-9-2, other processing for control, etc. The HMI updating generates an updated interface to be displayed to users based on the result data in the local database and can highly simulate the interface that is related to the power system to be displayed to users in the real-time operating system.

Figure 5:
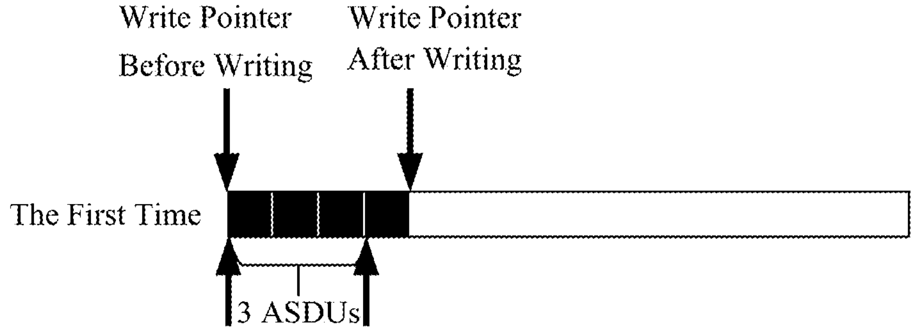
FIG. 5 is a schematic diagram of writing the data unit(s) into a second buffer and reading the data unit(s) from the second buffer according to an embodiment of the present disclosure.
Figure 5:
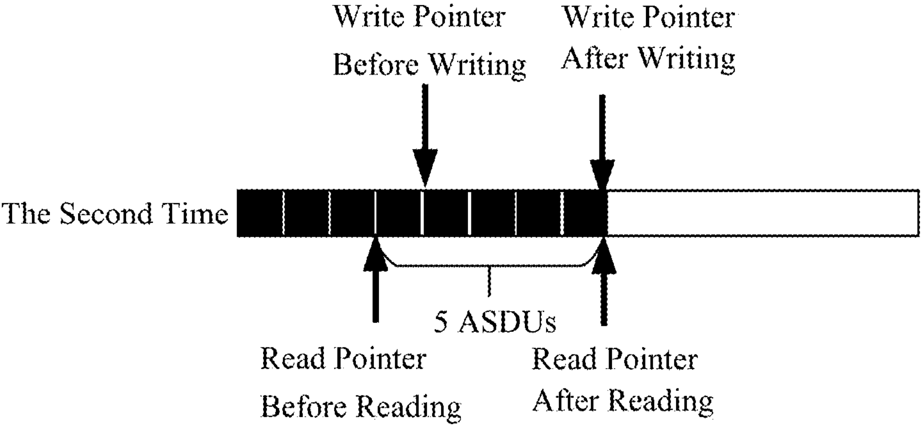

FIG. 5 is a schematic diagram of writing the data unit(s) into the second buffer and reading the data unit(s) from the second buffer according to an embodiment of the present disclosure.

Referring to FIG. 5, when the predetermined number of preprocessed data unit(s) are written from the first buffer into the second buffer (as shown in step S340 in FIG. 3), the preprocessed data unit(s) are written into the second buffer based on the write pointer of the second buffer, and the writer pointer of the second buffer points to an address space in the second buffer where the current data unit(s) should be written. For each writing, the offset of the write pointer after writing with respect to the write pointer before writing is determined as the predetermined number of the written data unit(s).

The real-time dedicated thread reads the preprocessed data unit(s) from the second buffer by the read pointer of the second buffer. Since the rate of processing the data unit(s) by real-time dedicated thread will be affected by the amount of processing tasks of computing device, it may be slower than the rate of writing the data unit(s) into the second buffer. Therefore, in order to process the data unit(s) in the second buffer as soon as possible to better meet real-time, when reading the second buffer, the number of data unit(s) read every time can be determined as the offset at which the read pointer after reading aligns with the current write pointer if the processing capability of the non-real-time operating system allows.

As shown in FIG. 5, the second buffer experiences the first reading operation, and the number of written data units is 4, so the offset between the write pointer before the first writing and the write pointer after the first writing is 4. Then, the second buffer experiences the first reading operation, and due to the limitation of processing capability, the number of data units read by the real-time dedicated thread is less than 4 and is only 3, so the offset between the read pointer after the first reading and the read pointer before the first reading is 3. Then, the second buffer experiences the second write operation, and the number of written data units is still 4 for the second write operation, so the offset between the write pointer before the second writing and the write pointer after the second writing is still 4. Then, the second buffer experiences the second reading operation. At this time, in order to improve the processing rate of data units in the second buffer to better meet the real-time, the offset of the read pointer in the second reading operation can be determined as 5 (corresponding to 4+4−3=5 data units), that is, 5 data units are read, and the read pointer after the second reading aligns with the current write pointer after the second writing.

In this way, the "catching up" between the read pointer of the second buffer and the write pointer of the second buffer can improve the processing rate of the data unit(s) in the second buffer, better meet the real-time, and prevent the processing of one or more of the data units written into the second buffer from being missed.

In general, under the computing power of the current common computing devices, for the second buffer, a situation in which the read pointer "cannot catch up" with the write pointer does not occur. However, this situation still needs to be taken into account. For example, the power frequency is 50 Hz and the sample rate is 4000 Hz, there are 80 sample points in one cycle wave, and each sample value message carries a sample value information for 4 sample points, then 20 frames of messages will be generated every 20 ms. If the computing capability of the computing device is lower than such a throughput, this situation in which the read pointer "cannot catch up" with the write pointer will occur. Therefore, the present disclosure also contemplates an error reporting mechanism for this situation. When the rate of reading data unit(s) from the second buffer is slower than the rate of writing data unit(s) from the first buffer into the second buffer, it becomes more and more difficult for the read pointer to "catch up" with the write pointer, until the determined offset of the read pointer exceeds the predetermined offset threshold (for example, 10 data units, which is not limited by the present disclosure) in a certain read operation, the real-time dedicated thread cannot read the data unit(s) in the second buffer according to the determined offset. At this time, an error information is reporting to inform users that time critical processing cannot be executed due to the read rate and the write rate of the second buffer cannot be matched with each other.

When the inventor of the present disclosure uses the Ethernet transmission rate of 100 Mbps and the processing frequency of 3.00 GHz, the CPU Intel Xeon E3-1220 v6 with 4 cores and 4 threads and the RAM of 16 GB to execute the method 300, the real-time processing of 96 sample value messages within 20 ms can be well achieved in a case that the sampling frequency is 4800 Hz and each sample value message carries one ASDU.

Figure 6:
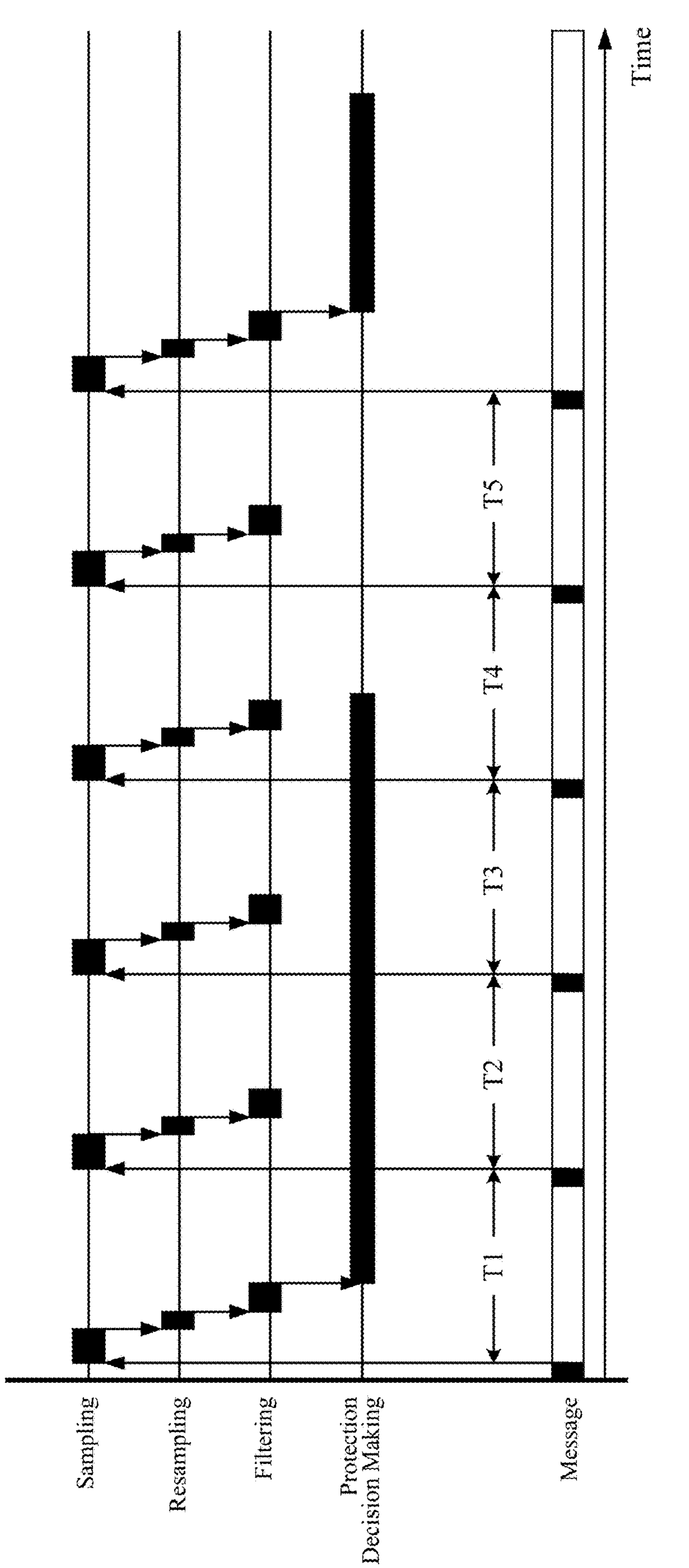
FIG. 6 is a schematic diagram of the result obtained by performing the method for executing time critical processing in non-real-time operating system according to an embodiment of the present disclosure.

FIG. 6 is a schematic diagram of result obtained by performing the time critical processing method according to an embodiment of the present disclosure in a non-real-time operating system.

Still taking the power system as an example, FIG. 6 illustrates the result obtained by performing time critical processing on the sample value message of the power system in Windows operating system. The sample value message is transmitted to the computing device of Windows operating system via 100 Mbps Ethernet, and the data unit(s) in the sample value message are written into the first buffer. When the predetermined number of data unit(s) are written into the first buffer, the predetermined number of data units are written into the second buffer and the real-time dedicated thread is triggered to execute time critical processing. For example, time critical processing includes sample value acquisition, sample value processing and protection decision making. Sample value acquisition is triggered in response to the real-time dedicated thread being triggered, which is used to read the data unit(s) from the second buffer and acquire the sample value(s) in the data unit(s). Sample value processing is triggered in response to the completion of sample value acquisition, which is used to process the acquired sample value(s) to obtain data that can be used to make a protection decision. Sample value processing may include multiple sub-processes which can be triggered in turn. As shown in FIG. 6, the sub-processes include resampling and filtering, and resampling is triggered in response to the completion of sample value acquisition and filtering is triggered in response to the completion of resampling. The present disclosure does not limit the number of sub-processes of sample value processing. The protection decision making is triggered in response to the sample value processing having been executed for the predetermined number of times (for example, 5 times), which is used to make a protection decision according to the data obtained by the sample value processing and can be used for making the protection decision.

T1, T2, T3, T4 and T5 in FIG. 6 each represent a time interval between two adjacent real-time dedicated threads are triggered, but they are not fixed values, and they are related to the Ethernet transmission rate and the computing capability of the computing device (as already described above). When the inventor of the present disclosure uses the Ethernet transmission rate of 100 Mbps and the processing frequency of 3.00 GHz, the CPU Intel Xeon E3-1220 v6 with 4 cores and 4 threads and the RAM of 16 GB to execute the method 300, each of the time intervals T1, T2, T3, T4, T5, etc. is much less than 1 ms, this achieves an effect comparable to that the real-time operating system in FIG. 1 can achieve. For a system under test with higher sample rate, higher Ethernet transmission rate and higher computing capability of computing device can be respectively configured with.

The method of executing time critical processing in the non-real-time operating system according to the embodiment of the present disclosure has been described above with reference to FIGS. 3-6, and the device for executing time critical processing in the non-real-time operating system according to the embodiment of the present disclosure will be described below with reference to FIG. 7.

Figure 7:
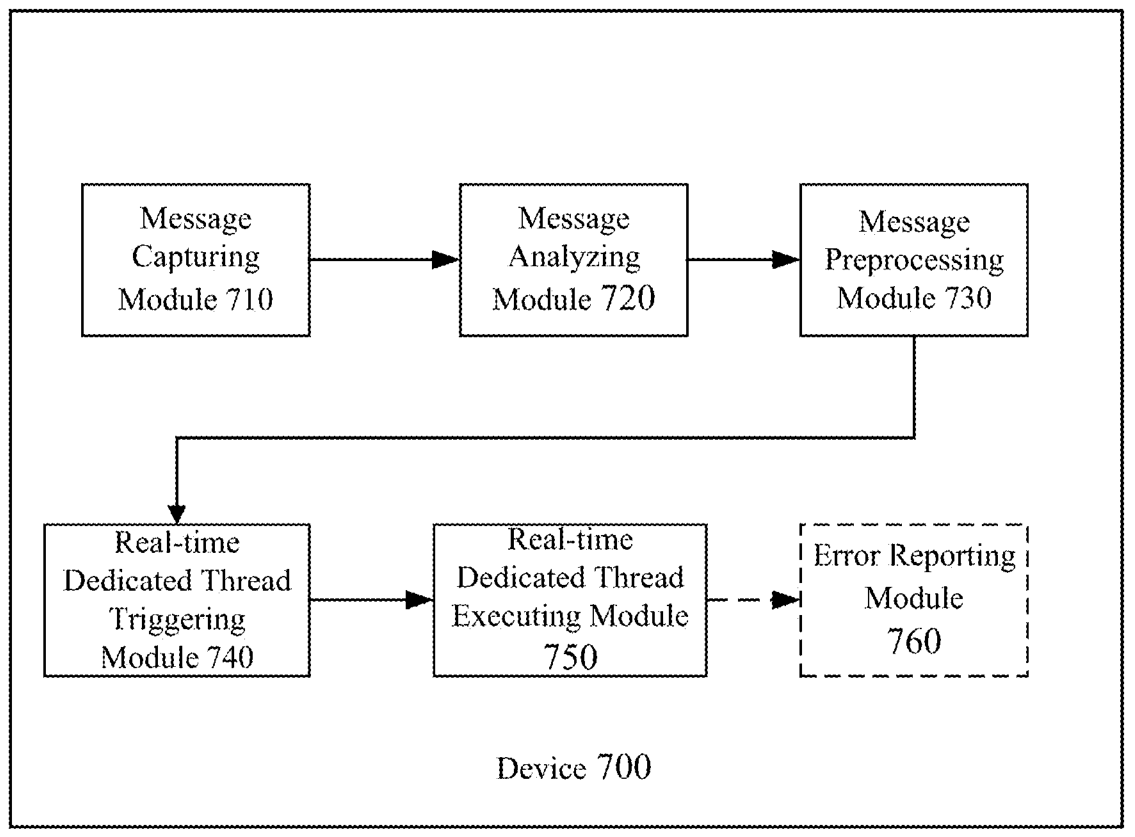
FIG. 7 is a schematic block diagram of the device for executing time critical processing in non-real-time operating system according to an embodiment of the present disclosure.

FIG. 7 is a schematic block diagram of a device for executing time critical processing in a non-real-time operating system according to an embodiment of the present disclosure, which may be a computing device such as personal computer, workstation, or server operating Windows operating system, for example.

Referring to FIG. 7, a device 700 for executing time critical processing in a non-real-time operating system according to an embodiment of the present disclosure at least includes a message capturing module 710, a message analyzing module 720, a message preprocessing module 730, a real-time dedicated thread triggering module 740 and a real-time dedicated thread executing module 750.

The message capturing module 710 may be a tool that can be used to receive the original message via the communication interface, for example, WinPcap tool under Windows operating system.

The message analyzing module 720 is used to analyze whether the message captured by the message capturing module 710 is a sample value message associated with time critical processing, and when it is determined that the message is the sample value message associated with time critical processing, the data unit(s) included in the sample value message is written into the first buffer. For example, for the example of the foregoing power system, the sample value message may be a sample value message conforming to, for example, the communication protocol IEC 61850-9-2.

The message preprocessing module 730 is used to preprocess the data unit(s) written in the first buffer. The preprocessing may include arranging and combining bytes of the data unit(s) so that bytes indicate the sample value(s) is located at specific position(s).

The dedicated real-time thread triggering module 740 is used to write the predetermined number of preprocessed data unit(s) from the first buffer into a second buffer that is dedicated to a real-time dedicated thread and triggering the real-time dedicated thread at the same time in response to the preprocessed data unit(s) in the first buffer reaching the predetermined number. For example, the real-time dedicated thread execution module 740 can trigger the real-time dedicated thread by Semaphore.

The real-time thread executing module 750 reads the data unit(s) from the second buffer and executes the time critical processing associated with the sample value message. For example, for the example of the foregoing power system, time critical processing includes but is not limited to sample value acquisition, sample value processing (including resampling, filtering, etc.), and protection decision making, etc.

As an example, the real-time dedicated thread triggering module 740 writes the preprocessed data unit(s) in the first buffer into the second buffer based on the write pointer of the second buffer, and for each writing, the offset of the write pointer is determined as the predetermined number of the preprocessed data unit(s). The real-time dedicated thread reads the data unit(s) from the second buffer based on a read pointer of the second buffer, and for each reading, the offset of the read pointer is determined as offset at which the read pointer after reading aligns with the current write pointer if the processing capability of the non-real-time operating system allows.

As an example, the device 700 may further include an error reporting module 760 for sending an error information when the offset for the read pointer of the second buffer is determined as exceeding the predetermined offset threshold.

As an example, the real-time dedicated thread also writes the result data generated by executing time critical processing into the local database for non-real-time dedicated thread to read and process, and the non-real-time dedicated thread executes non-time critical processing. For example, for the example of the foregoing power system, the non-time critical processing includes HMI updating, which updates the interface to be displayed to users based on the result data in the local database and can highly simulate the interface that is related to the power system to be displayed to users in the real-time operating system.

For simplicity, please refer to the above description combined with FIGS. 3-6 for details of the execution of the foregoing message capturing module 710, message analyzing module 720, message preprocessing module 730, real-time dedicated thread triggering module 740, real-time dedicated thread executing module 750 and error reporting module 760.

Under common network transmission rate and computing capability of computing devices, the method 300 and the device 700 for executing time critical processing in the non-real-time operating system according to the embodiment of the present disclosure can achieve an effect comparable to or better than that of the time-critical processing in the real-time operating system, by triggering the real-time dedicated thread for executing time critical processing for the sample value message through taking the number of data unit(s) included in the captured sample value message reaching the predetermined number as a trigger condition, by adopting the double buffering mechanism of the first buffer and the second buffer and dedicating the second buffer to the real-time dedicated thread, and by determining the number of data unit(s) to be read every time the real-time dedicated thread executes a read operation on the second buffer to avoid missing processing of one or more of the data unit(s).

In addition, for example, for the example of the foregoing power system, from the production and market perspectives, using the method 300 and the device 700 for executing time critical processing in the non-real-time operating system according to the embodiment of the present disclosure can also bring the following benefits: debugging and unit testing can be performed more easily on the non-real-time operating system such as Windows comparing with the real-time operating system, which brings great convenience to software developers; the validation and verification in software development can be performed in parallel with hardware development without waiting for the completion of hardware development, which saves the development periods; messages can be received directly from Ethernet without bulky signal generating device (e.g. relay protection tester of OMICRON CMC); and HMI updating of the non-time critical processing can highly simulate the interface that is related to the power system to be displayed to users in the real-time operating system, which facilitates the collection of customer feedback and requirements in the development and testing phases, reduces development risks and facilitates customer maintenance.

Although the present disclosure takes the power system as an example, it is apparently not limited to the power system, and it can also be applied to other systems under test that need real-time processing.

The embodiments described above are only schematic. For example, although in the above description, the real-time dedicated thread is triggered by the predetermined number of data unit(s) included in the sample value message, other trigger conditions such as the number of sample value messages can also be used to trigger the real-time dedicated thread. For another example, although in the above description, WinPcap is used as the package capturing tool and Semaphore is used as the tool for triggering the real-time dedicated thread, other tools that can implement equivalent functions can also be used.

Figure 8:
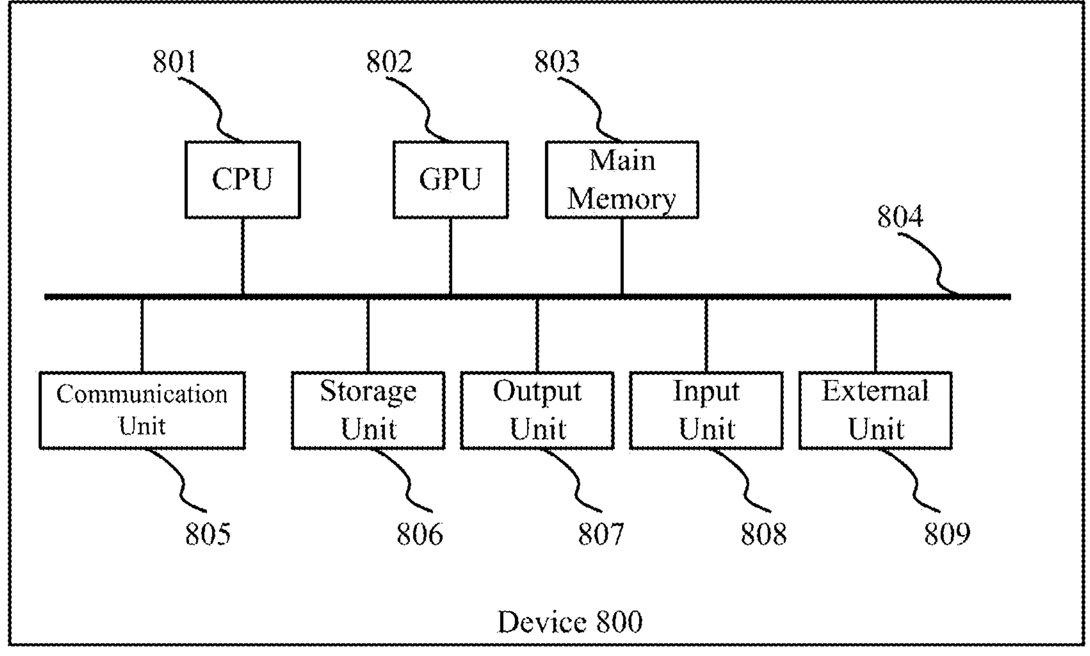
FIG. 8 is a schematic block diagram of the device for executing time critical processing in non-real-time operating system according to another embodiment of the present disclosure.

FIG. 8 is a schematic block diagram of a device for executing time critical processing in the non-real-time operating system according to another embodiment of the present disclosure.

A device 800 for executing time critical processing in the non-real-time operating system according to another embodiment of the present disclosure at least includes a memory for storing computer program instructions and a processor for executing the computer program instructions. When the computer program instructions are loaded and run by the processor, the processor executes the above-mentioned method 300 for executing time critical processing in the non-real-time operating system.

The device 800 shown in FIG. 8 for executing time critical processing in the non-real-time operating system can specifically include a central processing unit (CPU) 801, a graphics processing unit (GPU) 802 and a main memory 803. These units are interconnected by a bus 804. The central processing unit (CPU) 801 and/or the graphics processing unit (GPU) 802 can be used as the above-mentioned processor, and the main memory 803 can be used as the above-mentioned memory for storing computer program instructions. In addition, the device 800 may also include a communication unit 805, a storage unit 806, an output unit 808, an input unit 808 and an external device 809, which are also connected to the bus 804.

Figure 9:
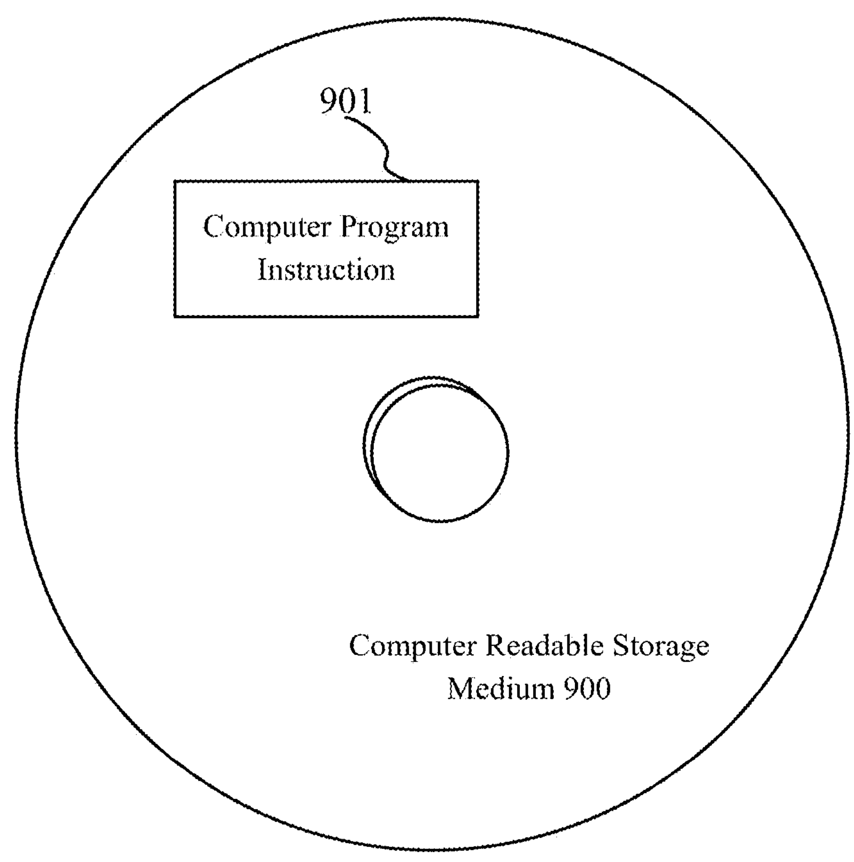
FIG. 9 is a schematic diagram of the computer-readable storage medium according to an embodiment of the present disclosure.

FIG. 9 is a schematic diagram illustrating a computer-readable storage medium according to an embodiment of the present disclosure. As shown in FIG. 9, the computer-readable storage medium 900 according to an embodiment of the present disclosure has computer program instructions 901 stored thereon. When the computer program instructions 901 are executed by the processor, the method 300 for executing time critical processing in the non-real-time operating system according to an embodiment of the present disclosure described with reference to the above figures is performed.

The computer-readable storage medium includes, but is not limited to, for example, a volatile memory and/or a non-volatile memory. The volatile memory may include, for example, a random access memory (RAM) and/or a cache, etc. The nonvolatile memory may include, for example, a read-only memory (ROM), a hard disk, a flash memory, an optical disk, a magnetic disk, etc.

The flowcharts and block diagrams in the appended drawings show the architectures, functions and operations that may be implemented according to the methods, devices and computer program products of the embodiments of the present disclosure. In this regard, each block in the flowcharts or block diagrams may represent a module, program segment or part of the code, which contains one or more executable instructions for implementing specified logical functions. It should also be noted that in some alternative implementations, the functions noted in the blocks may also occur in a different order than those noted in the drawings. For example, two consecutive blocks can actually be executed substantially in parallel, and sometimes they can be executed in a reverse order, depending on the functions involved. It should also be noted that each block in the block diagrams and/or flowcharts, and the combination of blocks in the block diagrams and/or flowcharts, can be implemented by a dedicated hardware-based system that executes specified functions or actions, or can be implemented by a combination of dedicated hardware and computer instructions.

In addition, functional modules in the embodiments of the present disclosure can be integrated to form one separate part, or each module can exist separately, or two or more modules can be integrated to form one separate part.

If the said functions are implemented in the form of function modules of software and sold or used as separate products, they can be stored in a computer readable storage medium. Based on such understanding, the technical solution of the present disclosure or the part that contributes to the prior art or the part of the technical solution can be embodied in the form of software product, which is stored in a storage media and includes several instructions to make a computer device (which can be a personal computer, a server, or a network device, etc.) execute all or part of the steps of the methods described in various embodiments of the present disclosure. The storage media mentioned above includes U disk, removable hard disk, Read-Only Memory (ROM), Random Access Memory (RAM), magnetic disk or optical disk or other media that can store program codes.

The above are only specific embodiments of the present disclosure, but the scope of the present disclosure is not limited to them. Any skilled in the art can easily think of modifications or replacement within the technical scope disclosed by the present disclosure, which should be included within the scope of the present disclosure. Therefore, the scope of the present disclosure should be based on the scope of the appended claims and their equivalents.

What is claimed is:

1. A method for executing time critical processing in non-real-time operating system, comprising:

capturing a message from an external device by a packet capturing tool;

analyzing whether the message is a sample value message associated with the time critical processing, and when the message is the sample value message associated with the time critical processing, writing a data unit included in the sample value message into a first buffer;

preprocessing the data unit written into the first buffer, the preprocessing including arranging and combining bytes of the data unit so that the bytes indicate a sample value is located at a specific position;

writing a predetermined number of preprocessed data units from the first buffer into a second buffer that is dedicated to a real-time dedicated thread in the non-real-time operating system and triggering the real-time dedicated thread at the same time to start executing the time critical processing, in response to the preprocessed data unit in the first buffer reaching the predetermined number;

writing a result data generated by executing the time critical processing by the real-time dedicated thread into local storage;

retrieving the result data from the local storage using a non-real-time dedicated thread in the non-real-time operating system; and simulating real-time interfaces for display to users on a real-time system in a non-real-time manner by the non-real-time dedicated thread based on the data from local storage, wherein the non-real-time dedicated thread executes non-time critical processing;

wherein the real-time dedicated thread is separate from any other thread, and wherein executing the time critical processing comprises reading the preprocessed data unit from the second buffer by the real-time dedicated thread.

2. The method according to claim 1, wherein writing the preprocessed data unit from the first buffer into the second buffer includes writing the preprocessed data unit into the second buffer based on a write pointer of the second buffer, and for each writing, the offset of the write pointer of the second buffer is determined as the number of written data unit; and reading the preprocessed data unit from the second buffer by the real-time dedicated thread includes reading the data unit from the second buffer based on a read pointer of the second buffer, and for each reading, the offset of the read pointer is determined as the offset at which the read pointer after reading aligns with the current write pointer if the processing capacity of the non-real-time operating system allows.

3. The method according to claim 2, wherein triggering an error information when the determined offset of the read pointer exceeds a predetermined offset threshold.

4. The method according to claim 1, wherein the time critical processing includes sample value acquisition, sample value processing and protection decision making, and the sample value acquisition is triggered in response to the real-time dedicated thread being triggered, which is used for acquiring the sample value in the data unit from the second buffer;

the sample value processing is triggered in response to the completion of the sample value acquisition, which is used for processing the sample value to obtain data for making a protection decision; and the protection decision making is triggered in response to the sample value processing having been executed for a predetermined number of times, which is used for making the protection decision according to the data for making the protection decision.

5. A device for comprising:

a non-real-time operating system configured to execute time critical processing, wherein the non-real-time operating system is configured to capture a message from an external device by a packet capturing tool;

wherein the non-real-time operating system is configured to analyze whether the message is a sample value message associated with the time critical processing, and when the message is the sample value message associated with the time critical processing, writing a data unit included in the sample value message into a first buffer;

wherein the non-real-time operating system is configured to preprocess the data unit written into the first buffer, the preprocessing including arranging and combining bytes of the data unit so that the bytes indicate a sample value is located at a specific position;

wherein the non-real-time operating system is configured to write a predetermined number of preprocessed data units from the first buffer into a second buffer that is dedicated to a real-time dedicated thread and triggering the real-time dedicated thread at the same time to start executing the time critical processing, in response to the preprocessed data unit in the first buffer reaching the predetermined number;

wherein the real-time dedicated thread is configured to write a result data generated by executing the time critical processing by the real-time dedicated thread into local storage, wherein a non-real-time dedicated thread in the non-real-time operating system is configured to retrieve the result data from the local storage and simulate real-time interfaces for display to users on a real-time system in a non-real-time manner by the non-real-time dedicated thread based on the data from local storage;

wherein the non-real-time dedicated thread executes non-time critical processing; and wherein the non-real-time operating system is configured to execute the time critical processing by reading the preprocessed data unit from the second buffer by the real-time dedicated thread, wherein the real-time dedicated thread is separate from any other thread.

6. The device of claim 5, wherein the non-real-time operating system writes the predetermined number of preprocessed data unit into the second buffer based on a write pointer of the second buffer, and for each writing, the offset of the write pointer of the second buffer is determined as the number of written data unit; and the real-time dedicated thread reads the preprocessed data unit from the second buffer includes reading the data unit from the second buffer based on a read pointer of the second buffer, and for each reading, the offset of the read pointer is determined as offset at which the read pointer after reading aligns with the current write pointer if the processing capability of the non-real-time operating system allows.

7. The device of claim 6, wherein the non-real-time operating system is configured to trigger an error when the determined offset of the read pointer exceeds a predetermined offset threshold.

8. The device of claim 5, wherein the time critical processing includes sample value acquisition, sample value processing and protection decision making, and the sample value acquisition is triggered in response to the real-time dedicated thread being triggered, which is used for acquiring the sample value in the data unit from the second buffer;

the sample value processing is triggered in response to the completion of the sample value acquisition, which is used for processing the sample value to obtain data for making a protection decision; and the protection decision making is triggered in response to the sample value processing having been executed for a predetermined number of times, which is used for making the protection decision according to the data for making the protection decision.

9. A device for executing time critical processing in a non-real-time operating system, comprising:

a processor; and a memory, having a computer executable program stored therein, which when executed by the processor, causes the device to execute the method of claim 1.

10. A non-transitory computer readable storage medium having a computer instruction stored thereon, which when executed by a processor, causes the processor to carry out the method of claim 1.

* * * * *